US006212438B1

(12) United States Patent
Reine

(10) Patent No.: US 6,212,438 B1
(45) Date of Patent: Apr. 3, 2001

(54) METHOD AND APPARATUS FOR GENERATING A MODEL OF AN INDUSTRIAL PRODUCTION

(75) Inventor: Frank Reine, Darmstadt (DE)

(73) Assignee: Schenk Panel Production Systems GmbH, Darmstadt (DE)

( * ) Notice: Subject to any disclaimer, the term of this patent is extended or adjusted under 35 U.S.C. 154(b) by 0 days.

(21) Appl. No.: 09/065,393

(22) Filed: Apr. 23, 1998

(30) Foreign Application Priority Data

Apr. 30, 1997 (DE) .............................................. 197 18 262

(51) Int. Cl.$^7$ ..................................................... G05B 13/02

(52) U.S. Cl. ................................ 700/48; 700/28; 700/29; 700/30; 700/31; 700/47

(58) Field of Search .................................. 700/48, 28, 29, 700/30, 31, 47

(56) References Cited

U.S. PATENT DOCUMENTS

| | | | |
|---|---|---|---|
| 5,159,660 | * 10/1992 | Lu et al. ................................. | 395/22 |
| 5,513,097 | * 4/1996 | Gramckow et al. .................... | 700/71 |
| 5,704,011 | * 12/1997 | Hansen et al. ......................... | 395/22 |
| 5,877,954 | * 3/1999 | Klimasaukas et al. ................ | 700/29 |
| 5,966,302 | * 10/1999 | Chrosny et al. ....................... | 700/48 |
| 5,999,893 | * 12/1999 | Lynch, Jr. et al. .................... | 702/181 |
| 6,000,827 | * 12/1999 | Hosogi et al. ......................... | 700/48 |

OTHER PUBLICATIONS

Article Entitled: "Fast Learning in Networks of Locally Tuned Processing Units", by John Moody and Christian J. Darken, published in Neural Computation, vol. 1, pp. 281 to 294; 1989 by MIT.

Article Entitled: "Regularization in the Selection of Radial Basis Function Centres", by Mark J. L. Orr, Neural Computation, vol. 7, No. 3, pp. 606–623, published in 1995 by MIT.

Article Entitled: "Orthogonal Least Squares Learning Algorithm for Radial Basis Function Networks", by S. Chen, C.F.N. Cowan, and P. M. Grant, IEEE Transactions on Neural Networks, vol. 2, No. 2, pp. 302–309; publication date Mar. 2, 1991.

Article Entitled: "An Information–Theoretic Approach to Neural Computing", by G. Deco and D. Obradovic, published by Springer Verlag, 1996.

* cited by examiner

Primary Examiner—Ayaz R. Sheikh
Assistant Examiner—Frantz Blanchard Jean
(74) Attorney, Agent, or Firm—W. F. Fasse; W. G. Fasse

(57) ABSTRACT

A process model of an industrial process or system is generated. The model correlates a first number M of process parameters forming input values with a second number L of quality characteristics forming output values, which are processed to form feedback control signals for the process or system. A third number N of training data sets of the industrial process are first gathered and processed during a learning phase of the model with the help of a central processing unit, whereby a preliminary approximately model is used including a neural network with local approximation characteristics. The neural network is connected in parallel with a linear network. Both networks are connected to the same inputs. The neural network initially has a number N of neural cells corresponding to the number of training data sets. A weighted linear combination of the M process parameters is performed. The linear network and the neural network are connected with their outputs through weighting circuits to a common summing point. A stepwise regression is performed to reduce the number of neural cells from N to K and of linear paths from M to M-R. Closed loop feedback signals control the industrial process.

9 Claims, 3 Drawing Sheets

METHOD AND APPARATUS FOR GENERATING A MODEL OF AN INDUSTRIAL PRODUCTION

PRIORITY CLAIM

This application is based on and claims the priority under 35 U.S.C. §119 of German Patent Application 197 18 262.3, filed on Apr. 30, 1997. The entire disclosure of German Patent Application 197 18 262.3 is incorporated herein by reference.

FIELD OF THE INVENTION

The invention relates to a method and to a system for generating a model of an industrial production and to control such a production with the help of the model. The industrial production relates, for example, to producing, on a mass production scale, paneling material such as chipboards.

BACKGROUND INFORMATION

Process models serve for approximating, analyzing, and optimizing of industrial processes. Such processes of process steps may be performed by an entire production line, by a few system components cooperating as an aggregate, or even by individual system components of a production line. The basic function of such process models is to provide on the basis of input parameters, output values that can be expected or predicted on the basis of the input parameters. The output values may be used in a closed loop or positive feedback control for influencing or fully controlling the industrial process or production.

Conventional process models are based on a linear formulation and are usually analyzed by means of known statistical methods. However, by using conventional linear formulations, it is not possible to satisfactorily model complex processes having non-linear characteristics. Thus, for modeling non-linear processes it is customary to use non-linear models such as neural networks which are capable of mapping or displaying complex non-linear response characteristics.

In order to identify the parameters of such non-linear models it is necessary to use non-linear optimizing algorithms which require an extremely high computer investment expense and effort, particularly during the so-called learning phase. Another particular difficulty is encountered in the formation of the neural network structure, such as the selection of the number of the individual neural cells to be incorporated into the network and to select the internetting connections of these neural cells within the network.

For further background information reference is made to the following publications, the content of which is incorporated herein by reference.

(A) John Moody and Christian J. Darken,

"Fast Learning in Networks of Locally Tuned Processing Units", published in: Neural Computation, Vol. 1, pages 281 to 294, published in 1989 by MIT, with regard to the "Radial Basis Functions Method" applying Gauss-functions;

(B) Mark J. L. Orr,

"Regularization in the Selection of Radial Basis Function Centres", Neural Computation, Vol. 7, No. 3, pages 606–623, published in 1995 by MIT, with regard to the "Stepwise Regression Method";

(C) S. Chen, C. F. N. Cowan, and P. M. Grant

"Orthogonal Least Squares Learning Algorithm for Radial Basis Function Networks", IEEE Transactions on Neural Networks, Vol. 2, No. 2, pages 302 to 309; publication date: Mar. 2, 1991, with regard to the "Forward Selection Method".

(D) G. Deco and D. Obradovic,

"An Information-Theoretic Approach to Neural Computing", Publisher: Springer Verlag, 1996, with regard to the variation of the selection criterium as an estimate of the expected generalized error.

OBJECTS OF THE INVENTION

In view of the foregoing it is the aim of the invention to achieve the following objects singly or in combination:

to provide a method and system for the generating of a model of an industrial process or industrial production, whereby the model shall be capable of approximately a non-linear response characteristics of complex processes and systems with a relatively small investment expense and effort compared to conventional systems using exclusively neural networks for such a purpose;

to construct such a system that the process model is capable of optimally learning while having a simple, yet clear structure that can be accomplished with a minimum number of neural cells;

to utilize the information provided by the model for a control, preferably a closed loop control of the industrial process or production to optimize its performance; and to advantageously utilize the capability of neural networks to map complex process characteristics in combination with well established statistical methods, especially linear methods in the same process model.

SUMMARY OF THE INVENTION

According to the invention there is provided a method for generating a model of an industrial production to provide control signals for optimizing said industrial production, comprising the following steps:

(a) gathering a number N of training data sets for said industrial production, (b) connecting a first neural network (5) in parallel to a second linear network (6), said neural network being formed initially by a number of neural cells corresponding to said number N of training data sets, said linear network being formed by M linear paths and to a corresponding number M of linear inputs provided in common for said first and second networks (5, 6), to provide a preliminary model for simultaneously performing linear combinations of input values in the first and second networks to thereby train and optimize said first and second networks together, (c) processing by said neural cells with the application of radial basis functions an input vector into individual first activating values, (d) applying by said neural cells first weighting factors to said individual first activating values to provide first weighted values, (e) linearly combining said first weighted values to provide first combined values, (f) supplying said first weighted values and said first combined values to an output summing circuit, (g) applying further weighting factors to said input values in said linear second network to provide second weighted values, (h) simultaneously linearly combining said further weighted values to provide second combined values, (i) supplying weighted and combined second values to said output summing circuit, (j) performing an R number of regression steps and terminating said regression steps in accordance with a stop criterium which determines an over-adaption when said initial number N of neural cells is reduced to a lower number K of neural cells in said neural network and when said number M of linear paths is reduced to a lower number M-R of linear paths in said linear network, o provide a reduced final model, (k) ascertaining actual process or production parameters and supplying said actual process or production parameters to said reduced final model, (l) determining by said reduced final model expected or rated quality characteristics of a product to be manufactured by said industrial production to provide respective rated quality output values, (m) processing said rated quality output values with the help of an optimizing algorithm to provide production control values, and (n) controlling said industrial production by said control values.

According to the invention, there is further provided an apparatus for generating a model of an industrial production, comprising a neural network (5) including a number K of neural cells (7), a linear network (6) including a number M of linear signal paths, conductors connecting said neural network (5) and said linear network (6) in parallel to each other for simultaneously training and optimizing said neural and linear networks, to form a parallel circuit for performing weighted linear combinations of maximally M input parameters, a number of ($x_1$ to $x_{nM}$) of input terminals to which said parallel circuit is connected for receiving said M input parameters, and a summing point (9) connected in common to all said neural cells (7) and to all said linear signal paths (6A, 6B, . . . ), wherein said M process parameters forming input values are correlated with a number L of production quality characteristics forming output values with the help of N training data sets, whereby K is smaller than or equal to N, to provide control signals for said industrial production.

The combination of a linear network made up of linear paths such as linear conductor paths and a neural network made up of neural cells, connected in parallel to each other as taught by the invention uses the ability of neural networks to model very complex process characteristics in combination with well established statistical methods. The combined parallel network provides a surprising result in that statistical methods can be used in the combined network. Conventionally it is not possible to use statistical statements or conclusions in neural networks alone that do not have a linear network connected in parallel to the neural network.

A preferred embodiment of the invention provides that the neural cells operate in accordance with the method of radial basis functions, whereby it is particularly advantageous for the approximation quality of the process model if the radial basis functions are of the Gauss-type. The method of radial basis functions is, for example, described in the above mentioned reference (A).

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Definitions of Symbols Used Herein

| | | |
|---|---|---|
| 1) $c_1 \ldots C_k$ | = | weighting factors of the neural cells |
| 2) $d^2_{nk}$ | = | Euklidic distance or spacing between the output data set and the basis center of the k-th neural cell |
| 3) exp | = | exponential function ($e^x$) |
| 4) $h_1 \ldots h_k$ | = | activating values or output values of the neural cells |
| 5) K | = | number of neural cells after reduction |
| 6) L | = | number of predictable or given rated output values, e.g. quality requirements of chip panels |
| 7) M | = | number of measured or actual input values (process values and process parameters) |
| 8) N | = | number of training data sets corresponding to number of neural cells prior to reduction; |
| 9) R | = | number of input values reduced by the reduction operation (also number of regression steps) |
| 10) r | = | width parameter of Gauss-function |
| 11) $V_k$ | = | k-th basis center or vector of the parameter of the k-th neural cell |
| 12) $V_{k1}, V_{k2} \ldots V_{kM}$ | = | components of $v_k$ of the k-th neural cell |
| 13) $w_0$ | = | constant value |
| 14) $w_1, w_2 \ldots W_M$ | = | weighting factors of the actual, measured input values (M) |
| 15) $X_n$ | = | n-th input data set (vector notation) |
| 16) $x_{n1}, x_{n2}, \ldots X_{nM}$ | = | components of the n-th data input set |
| 17) $y_n$ | = | n-th output data set (vector notation) |
| 18) $y_{n1}, y_{n2}, \ldots y_{nL}$ | = | components of the n-th data output set |

The method and system according to the invention for generating a process model of an industrial process or production, is useful for example, for controlling the production and quality of chipboard panels. Generally, the teaching of the invention can be used for analyzing production processes, especially for predicting and monitoring the production quality and for optimizing the industrial process and productions. The control provided by the present model rests on measured and/or given process parameters and is used for the prediction of product quality measures for the process control in such a way that the process costs are minimized while a desired or required production quality is maintained. In connection with the specific example embodiment of producing chipboard panels, it is the aim to maintain a desired production quality while at the same time minimizing or optimally reducing the use of resources such as energy, water and adhesives.

Figure 1:
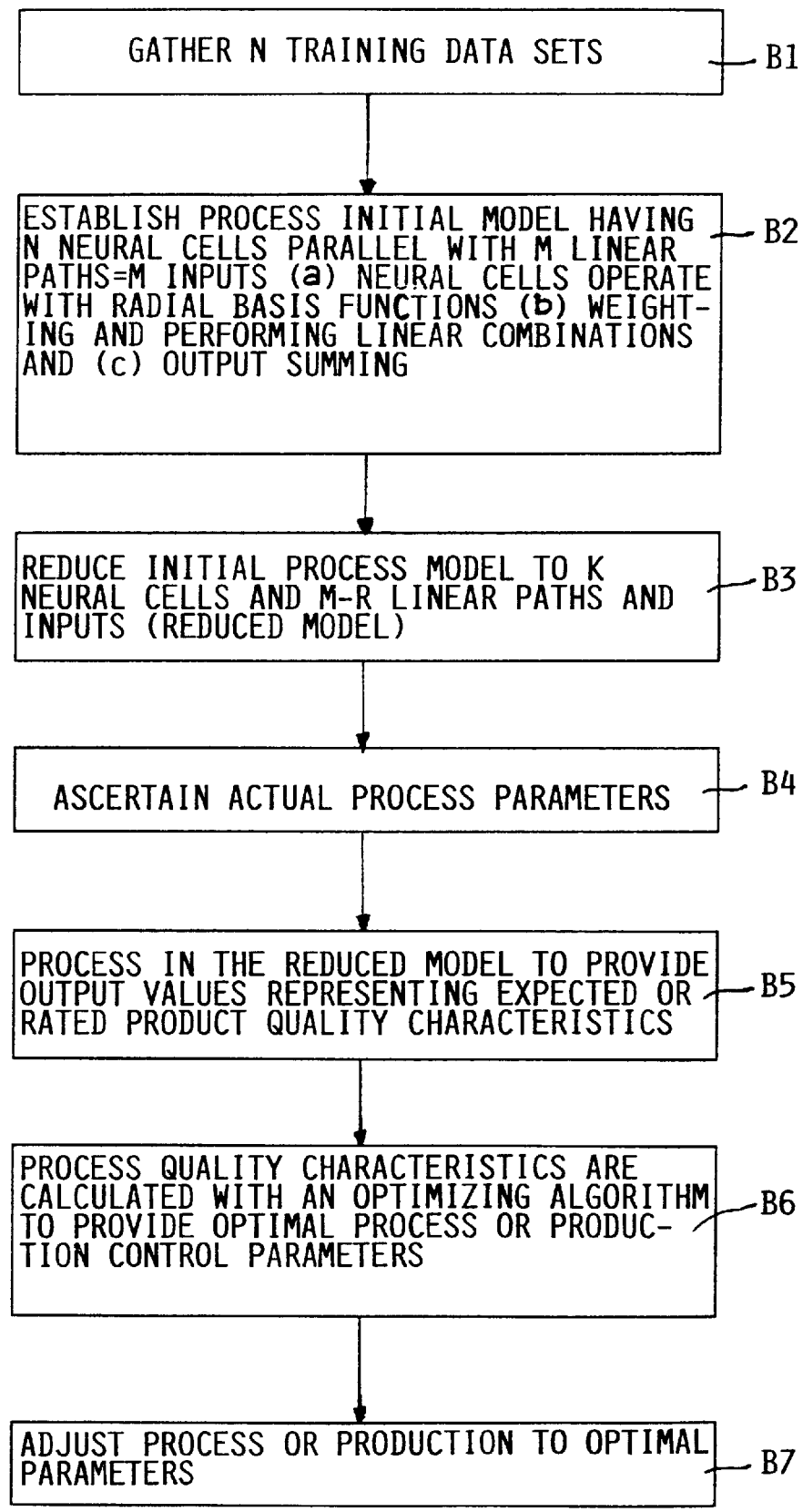
FIG. 1 is a block flow diagram of the basic steps of the present method for establishing an industrial process or production model.

The block diagram of FIG. 1 illustrates the main steps and several substeps performed in the generation of the present model and its use for the control of a production line for chipboards. The first step involves the ascertaining or gathering of a number N of training data sets shown in box B1. The N training data sets are process parameters and quality values at a defined point of time within a production sequence. These process parameters are on the one hand adjustable values, and on the other hand values that cannot be influenced. The adjustable values are, for example factors representing adhesive quantities, feed advance speeds, chip sizes, liquid quantities, and so forth. The non-adjustable values that cannot be influenced are actual valves ascertained by measurements or sensors and involve, for example, temperatures, pressures, and the distance moved by a chipboard press to apply compression to a panel being formed to assure the required panel density. While temperatures and pressure as such are adjustable, they are insofar not adjustable in the present context as the production must take place at a fixed required temperature and at a fixed required pressure applied to the panels being formed. These process parameters, as mentioned, are referred to as training parameters if the respective values are ascertained at a certain point of time.

A second step in the block diagram of FIG. 1 shown in box B2 involves producing a temporary process model having a number N of neural cells. This number N of neural cells corresponds initially to the number N of training data sets. ascertained in the first step. In the second step the temporary process model is provided with a number M of linear inputs corresponding in number to M linear paths connected in parallel to the neural cells. The following substeps are performed as part of the second step. The substeps of the second step of the second step involve substep (a): subste (a): processing input vectors with the aid of radial basis functions to transform these input vectors into individual activating values, said processing being performed with the aid of the neural cells in the neural network. Substep (b) involves forming linear combinations of the individual activating values after weighting has been applied to the activating. Substep (c) involves supplying these weighted and combined values to an output summing network to which all neural cells and all linear paths are connected in common. A linear combination in this context involves the summation of variables which have been multiplied by different factors. These linear combinations of the input values are performed simultaneously in the parallel connected neural and linear networks. The linearly combined values in the linear network section are all supplied to the same summing network or summing output.

A third step 3 shown in box B3 involves reducing the initial process model to obtain a neural network with a number K of neural cells and a number M-R of linear inputs to and linear paths of the linear network. The reduced number K of neural cells is substantially lower than the initial number N of neural cells. Step 4 shown in box B4 involves ascertaining the actual process parameters. Step 5 shown in box B5 involves processing the actual process parameters in the reduced process model to provide output values for the quality characteristics to be expected which correspond to rated or desired values. Step 6 shown in box B6 calculates optimizing process parameters with an optimizing algorithm to provide output control signals at the summing output of the reduced process model. Step 7 shown in box B7 involves adjusting the industrial process steps or system components in accordance with the output signals from the model.

Figure 2:
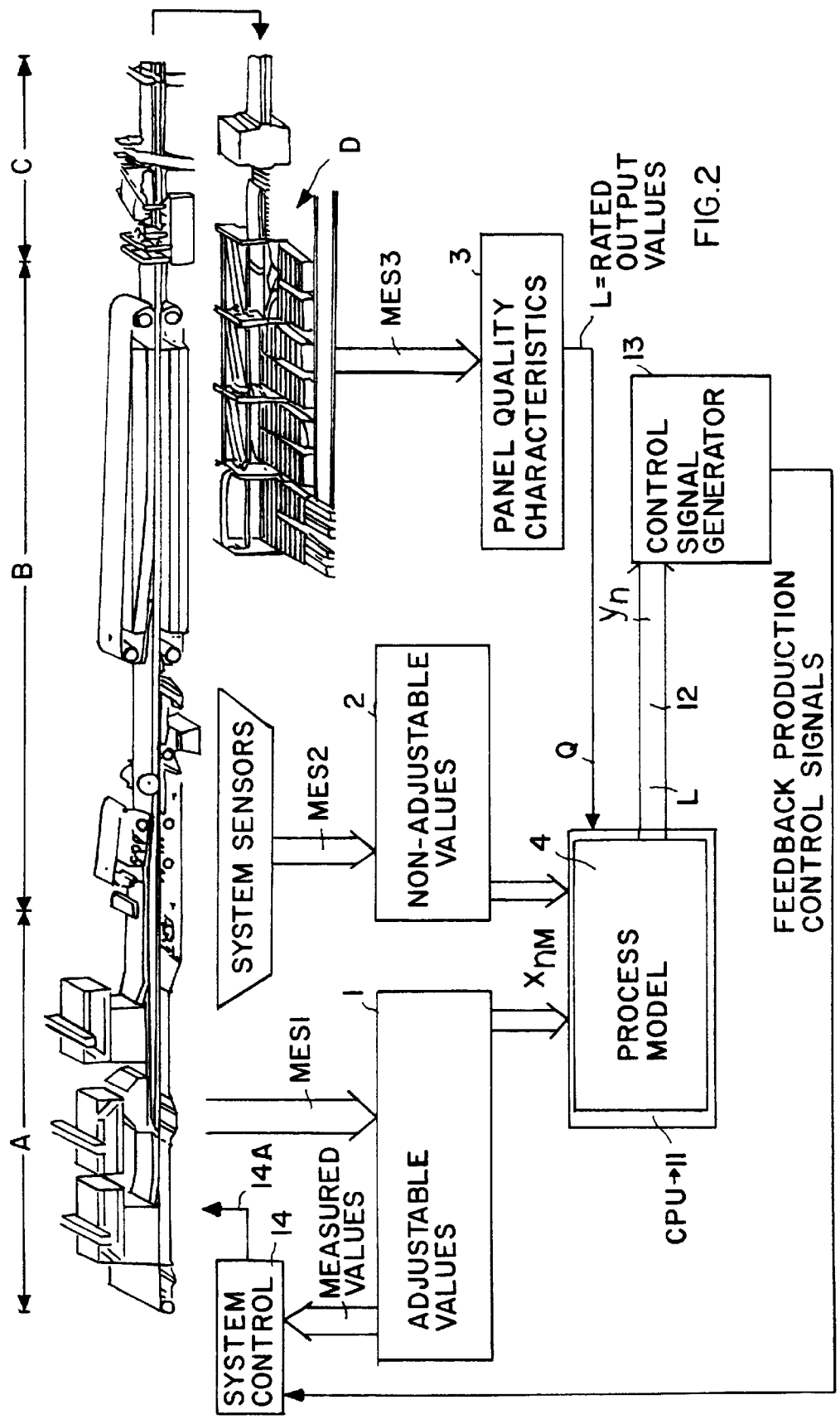
FIG. 2 is a block diagram of the present system used for controlling the assembly line production of chipboard panels.

FIG. 2 shows in its upper portion the relevant sections of a chipboard production assembly line. Section A of that line includes the main molding press. Section B represents the molding and feed advance tapes. Section C represents the cutting station. Section D illustrates the quality control section for the finished particle boards. As mentioned above, process parameters are primarily of two kinds. One kind involves adjustable values represented in box 1 and ascertained at MES1. Such adjustable values involve, for example an adhesive or gluing factor, a belt speed value, a particle size value, liquid quantity values, and similar values. Box 2 represents values that are not influenced of variable and these values are ascertained by measurements MES2. Such measured values are, for example temperatures, pressures, parameters representing the operation of the panel press, and similar parameters. These process parameters 1 and 2 provide the input values M for the process model formation.

Quality characteristics for the particle boards to be manufactured are, for example, the required material strength, including a shearing strength, the dimensional stability of the panels including a moisture expansion or swelling factor and the bending strength which are ascertained by tests in the laboratory. The adjustable values 1, the non-adjustable values 2 and the panel quality characteristics 3 provide the training data sets required for the model formation whereby the above mentioned, parallel connected neural and linear networks are trained simultaneously. A block 4 represents the process model as part of a central processing unit CPU 11 which receives at its inputs $x_{n1}$ to $x_{nM}$ the adjustable values 1 and the non-adjustable values 2 and at its input Q the panel quality characteristics.

The purpose of the process model is to form of the input parameters M the quality control output values L in accordance with a suitable function to be described in more detail below. For this purpose the above mentioned training data sets are first gathered during a learning phase corresponding to a determined length of time, whereby the training data sets include process parameters and quality values at a particular point of time within the limited time duration. The process model 4 shall be generated with regard to its structure by a number of N training data sets which include already a verified correlation or coordination of input values to the output values which means, for example for the N-th training data sets the coordination of the input values $x_{n1}$, $x_{n2}$ ... $x_{nm}$ to the output values $y_{n1}$, $y_{n2}$ ..., $y_{nL}$. These individual input and output values can be expressed as input vectors $x_n$ or output vectors $y_n$ respectively.

The process model 4 is generated as described in more detail below in the central processing unit 11 shown in FIG. 2 in which the model will be used to process the controllable or adjustable input values and the non-adjustable process parameters input values, or rather as respective input vectors. The process model provides resulting output values L that are transmitted into a control signal generator 13 which is also a processing unit capable of processing the values L on the data bus 12 in accordance with an optimizing algorithm to be described below.

The values L provided to the control signal generator 13 represent or define the predicted quality or rated quality characteristics that must be met by the finished chipboard panels. As mentioned, an optimizing algorithm is employed in the control signal generator 13 to process the adjustable or influenceable process parameters 1 for generating the feedback control signals on the basis of the rated control values. The feedback control signals are submitted to a process control unit 14 which adjusts the respective system components as indicated by the arrow 14A. The system control 14 also receives measured adjustable values or signals and compares these signals with the rated feedback control signals to provide the system control output signals represented by the arrow 14A.

Figure 3:
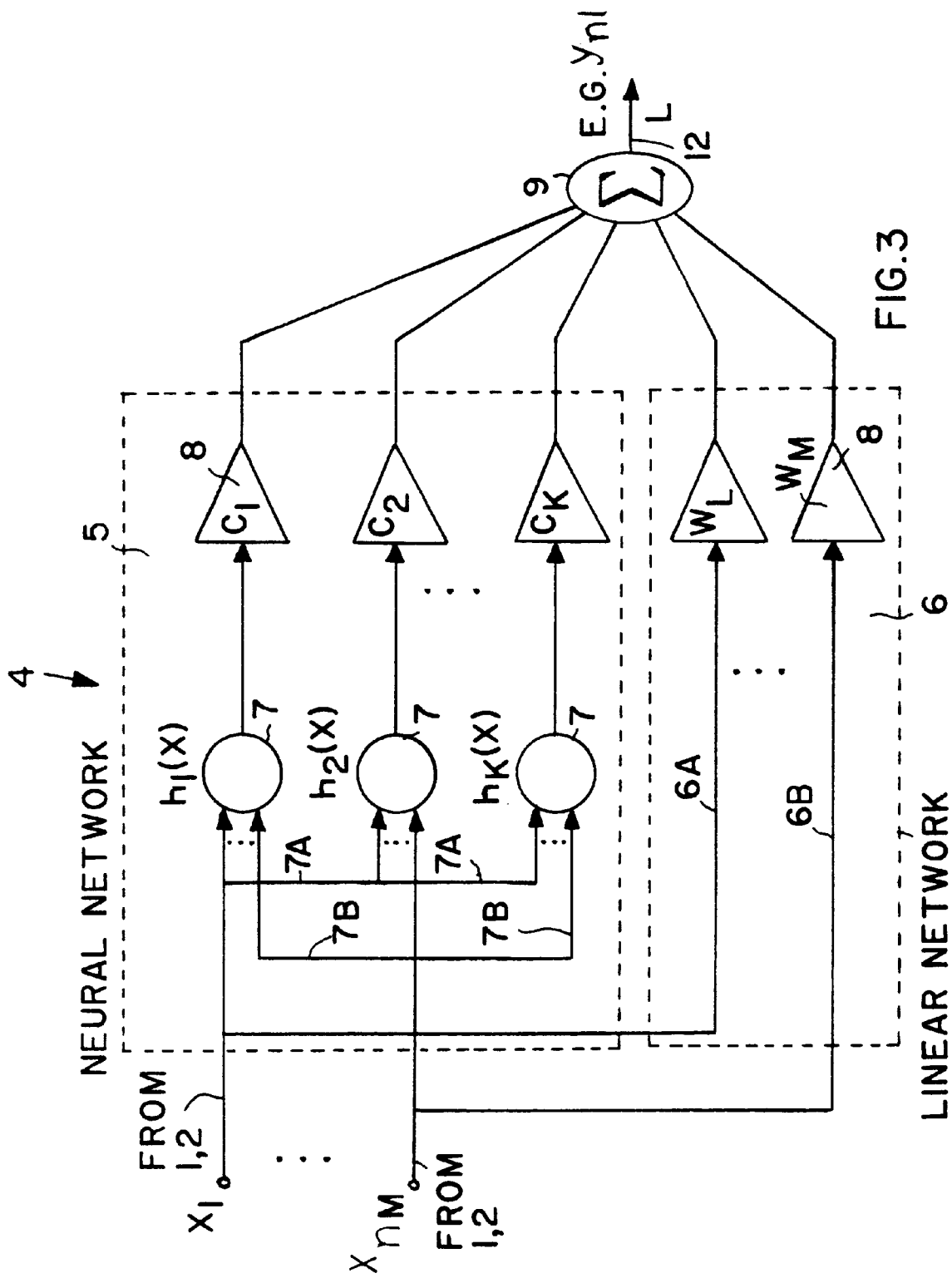
FIG. 3 shows a schematic circuit diagram of a process model according to the invention in which a neural network is connected in parallel with a linear network.

FIG. 3 shows the process model 4 comprising a neural network 5 and a linear network 6 connected in parallel to each other. The neural network 5 comprises a plurality of neural cells 7 which are intermeshed as indicated by the signal paths 7A, 7B. Thus, each neural cell 7 is intermeshed with each other neural cell and connected to the inputs $x_1$ to $X_{nM}$. These inputs are also connected to the linear network 6 including linear signal paths 6A, 6B, . . . , whereby the linear network 6 and the neural network 7 are connected in parallel for simultaneous linear combinations of the input values.

The output of the neural cells 7 and the outputs of the linear signal paths 6A and 6B are connected to weighting processors 8 such as multipliers which receive weighting factors which are determined in accordance with least errors squares method. The weighting factors $c_1, c_2 \ldots c_k$ are provided for the outputs of the neural network cells and weighting factors $w_1$ to $w_M$ are provided for the linear network. The outputs of the multipliers 8 are connected to a common summing network 9 that provides the output signal L on the database 12 for further treatment in the signal control generator 13 as described above.

The neural cells 7 process the input vectors in accordance with the individual activating values $h_1$ to $h_k$ as shown in FIG. 3. Such processing involves the use of radial basis functions which represent the distance or spacing of an input vector $x_n$ to the basis center $V_k$ of the respective function. In the example embodiment radial basis functions of the Gauss-type are used and the above mentioned distance or spacing is the Euklidic distance $d_{nk}^2$. This distance is expressed by Equation (1) as follows:

$$d_{nk}^2 = \|X_n - V_k\|_2^2 = \sum_{m=1}^{M}(x_{nm} - v_{km})^2 \quad \text{Equation (1)}$$

The neural cells 7 are distinguished from one another with regard to the individual basis centers. These neural cells have so-called local approximation characteristics. The activating values $h_1 \ldots h_k$ are then calculated from the Euklidic distance $d_{nk}^2$ and from the expansion parameter of the Gauss-function by application of Equation (2).

$$h_k(x_n) = \exp\left(-\frac{d_{nk}^2}{r^2}\right) \quad \text{Equation (2)}$$

The activating or output values of the neural cells are then ascertained, following a linear combination of the basis functions by Equation (3).

$$y_{nl} = \sum_{k=1}^{K} h_k(X_n) C_{kl} \quad \text{Equation (3)}$$

In Equation (3) the term $c_1$ to $c_{kl}$ are the so-called weighting factors as applied in the weighting multipliers 8. The outputs of these weighting multipliers are all connected to the common summing network 9.

As mentioned, the linear network 6 is connected according to the invention in parallel to the neural network 5, whereby the linear network sections 6A and 6B receive the inputs $x_1$ to $x_{nM}$ as shown in FIG. 3. This linear network also performs a linear combination of the input values, whereby the respective weighting values $w_1$ to $w_M$ are applied in the multipliers 8. The outputs of these multipliers 8 are also supplied to the common summing network 9, whereby for example the l-th output of the combining or summing network is calculated as follows:

$$y_{nl} = \sum_{k=1}^{K} h_k(x_n)C_{kl} + \sum_{m=1}^{M} x_{nm}w_{ml} + w_0 \quad \text{Equation (4)}$$

Thus, the value $y_{nl}$ is the sum of the neural weighted components and the sum of the linear weighted components plus a constant $w_0$. The constant value $w_0$ represents a term of the zero-order of the linear component.

The weighting factors are ascertained with the aid of the method of the smallest error squares applied to the training data sets. Although the basis centers $v_k$ contain non-linear parameters, it is possible, surprisingly, to use statistical methods such as the mentioned method of the smallest error squares for finding the solution for the basis centers if within the neural network there is provided initially a neural cell for each of the N training data sets. The center of the respective neural cell is thus positioned on the corresponding input vector. The neural starting model thus comprises for the first phase a number N of neural cells. Each basis center corresponds in this initial phase to an input vector $x_n$. All non-linear parameters can be ascertained in this step and it is then possible to use known statistical evaluation methods such as the above mentioned least error squares method.

The initial model is rather involved because it initially requires a substantial memory capacity and has additionally a very high variance causing problems of over-adaptation. These problems are solved according to the invention by the following application of a stepwise regression, whereby the determination of a more sensible and more economical model structure is obtained, resulting in a substantially simplified model, more specifically in a model requiring a substantially smaller number of neural cells. This stepwise regression model can be used according to the invention because at the time when this regression model is used, the non-linear parameters are already known. Reference is made in this connection to the publication (B) cited above.

A variant of the above described regression method is the so-called forward selection algorithm which first starts with an empty regression model and a large number of basis functions that could possibly be used. Then, for each possible function or "candidate" the model error or rather the reduction of the model error is calculated and compared to ascertain what error reduction would result from the addition of a further function for calculation, whereby the base function is added to the model which achieves the largest error reduction. In the next step again the model error is ascertained for each of the remaining possible functions which model error would be caused by the addition of that function, whereby again that function is picked which would cause the largest error reduction. These steps of ascertaining which function would result in the largest error reduction are reported until a stop criterium is reached, to find the required model structure. Reference is made in this connection to the publication (C) cited above.

The stop criterium takes into account the change of the selection criterium as an estimate of the generalized error to be expected prior to and after the addition of a new basis function. Reference is made in this connection to the publication (D) cited above. If the selection criterium increases following the addition of a further basis function, it is concluded that the model passes into a range of over-adaptation and the selection process is then stopped at this point. At this time there are only K neural cells 7 left in the neural network 5 including their multipliers for the respective weighting factors $c_1$ to $c_k$. Since the stepwise regression is performed simultaneously for the linear network 6, the number of the input parameter linear combinations and their weighting factors w is also reduced. The number of linear circuit network paths is thus reduced to M-R of linear combinations, wherein R corresponds to the number of regression steps that reduced the initial number M. Linear combinations are performed in both reduced networks 5, 6.

The reduction of the process model with regard to the number of neural cells and with regard to the number of linear network paths by the stepwise regression simplifies the model structure so significantly that even very complicated manufacturing processes can be calculated quickly on standard personal computers used as the CPU 11 and then can accordingly be displayed in an economical manner even if such complex processes should initially require a large number of training data sets, for example 1000 of such sets, for the learning step.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for generating a model of an industrial production to provide control signals for optimizing said industrial production, comprising the following steps:
   (a) gathering a number N of training data sets for said industrial production,
   (b) connecting a first neural network (5) in parallel to a second linear network (6), said neural network being formed initially by a number of neural cells corresponding to said number N of training data sets, said linear network being formed by M linear paths corresponding to a number M of linear inputs provided in common for said first and second networks (5, 6), to provide a preliminary model for simultaneously performing linear combinations of input values in the first and second networks to thereby train and optimize said first and second networks together,
   (c) processing by said neural cells with the application of radial basis functions an input vector into individual first activating values,
   (d) applying by said neural cells first weighting factors to said individual first activating values to provide first weighted values,
   (e) linearly combining said first weighted values to provide first combined values,
   (f) supplying said first weighted values and said first combined values to an output summing circuit,
   (g) applying further weighting factors to said input values in said linear second network to provide second weighted values,
   (h) simultaneously linearly combining said further weighted values to provide second combined values,
   (i) supplying weighted and combined second values to said output summing circuit,
   (j) performing an R number of regression steps and terminating said regression steps in accordance with a stop criterium which determines an over-adaptation when said initial number N of neural cells is reduced to a lower number K of neural cells in said neural network and when said number M of linear paths is reduced to a lower number M-R of linear paths in said linear network, to provide a reduced final model,
   (k) ascertaining actual process or production parameters and supplying said actual process or production parameters to said reduced final model,
   (l) determining by said reduced final model expected or rated quality characteristics of a product to be manufactured by said industrial production to provide respective rated quality output values,
   (m) processing said rated quality output values with the help of an optimizing algorithm to provide production control values, and
   (n) controlling said industrial production by said control values.

2. The method of claim 1, further comprising combining said radial basis functions.

3. The method of claim 1, wherein said radial basis functions are Gaussian functions having a local approximation characteristic.

4. The method of claim 1, wherein said stepwise regression is performed with a forward selection algorithm.

5. The method of claim 1, wherein said number M of linear paths corresponds to a number of process or production parameters forming said input values, and correlating said input values to a number L of quality characteristics for forming output values for controlling a process or production.

6. A apparatus for generating a model of an industrial production, comprising a neural network (5) formed by a number K of neural cells (7) having local approximation characteristics, a linear network (6) formed by a number M of a linear signal paths, conductors connecting said neural network (5) and said linear network (6) in parallel to each other for simultaneously training and optimizing said neural and linear networks, to form a parallel circuit for performing weighted linear combinations of maximally M input parameters, a number ($x_1$ to $x_{nM}$) of input terminals to which said parallel circuit is connected for receiving said M input parameters, and a summing point (9) connected in common to all said neural cells (7) and to all said linear signal paths (6A, 6B, . . . ), and a central processing unit (11) for correlating said M process parameters forming input values with a number L of production quality characteristics forming output values with the help of N training data sets, wherein K is smaller than N, to provide control signals for said industrial production.

7. The apparatus of claim 6, wherein said neural cells (7) are radial basis neural cells.

8. The apparatus of claim 6, further comprising weighting multipliers (8) connected between said neural cells (7) and said summing point (9) and between said linear signal paths and said summing point (9).

9. The apparatus of claim 6, further comprising a control signal generator connected to said central processing unit (11) for providing said production control signals.

* * * * *

UNITED STATES PATENT AND TRADEMARK OFFICE
CERTIFICATE OF CORRECTION

PATENT NO. : 6,212,438 B1  
DATED : April 3, 2001  
INVENTOR(S) : Reine

It is certified that error appears in the above-identified patent and that said Letters Patent is hereby corrected as shown below:

<u>Title page,</u>  
Under [57] Abstract,  
Line 9, after "preliminary", replace "approximately" by -- approximating --;

<u>Column 1,</u>  
Line 21, before "pro-", replace "of" by -- or --;  
Line 45, after "network", replace "structure" by -- structures --;

<u>Column 2,</u>  
Line 13, after "of", replace "approximately" by -- approximating --;

<u>Column 4,</u>  
Line 32, after "...", replace "$W_M$" by -- $w_M$ --;  
Line 34, after "...", replace $X_{nM}$ by -- $x_{nM}$ --;

<u>Column 5,</u>  
Line 21, after "step" (1st occurrence), delete "of the second step";  
Line 22, before "processing", delete "substep (a)", (2nd occurrence);  
Line 28, after "activating", insert -- values --;  
Line 66, after "influenced", replace "of" by -- or --;

<u>Column 6,</u>  
Line 33, before "to", replace "$X_{nm}$" by -- $X_{nM}$ --;

<u>Column 7,</u>  
Line 25, after "distance", replace "$d_{nK}^2$" by -- $d^2$ --;  
Line 25, after "distance", replace "$d_{nK}^2$" by -- $d^2$ --;

Signed and Sealed this

Thirtieth Day of October, 2001

Attest:

NICHOLAS P. GODICI  
*Attesting Officer*    *Acting Director of the United States Patent and Trademark Office*